US005217664A

United States Patent [19]

Feichtinger

[11] Patent Number: 5,217,664

[45] Date of Patent: Jun. 8, 1993

[54] PROCESS FOR THE PRODUCTION OF A COMPONENT BY PRODUCING A MOLDING USING A METAL OR CERAMIC POWDER AS THE STARTING MATERIAL

[75] Inventor: Heinrich Feichtinger, Hinteregg, Switzerland

[73] Assignee: Asea Brown Boveri Ltd., Baden, Switzerland

[21] Appl. No.: 668,916

[22] Filed: Mar. 13, 1991

[30] Foreign Application Priority Data

Mar. 14, 1990 [CH] Switzerland ........................ 815/90-8

[51] Int. Cl.$^5$ .......................... C04B 35/64; B22F 3/04

[52] U.S. Cl. ........................................ 264/56; 264/65; 264/102; 264/313; 264/317; 264/517; 419/38; 419/39; 419/66

[58] Field of Search ................. 264/56, 102, 313, 317, 264/517, 65; 419/38, 39, 66

[56] References Cited

U.S. PATENT DOCUMENTS

| | | | |
|---|---|---|---|
| 2,513,785 | 7/1950 | Browne | 264/517 |
| 4,473,526 | 9/1984 | Buhler | 264/517 |
| 4,582,682 | 4/1986 | Betz | 264/DIG. 78 |
| 4,927,600 | 5/1990 | Miyashita | 264/317 |

FOREIGN PATENT DOCUMENTS

| | | |
|---|---|---|
| 0191409 | 12/1989 | European Pat. Off. . |
| 1646585 | 3/1972 | Fed. Rep. of Germany . |
| 3101236 | 1/1982 | Fed. Rep. of Germany . |
| 3128347 | 2/1983 | Fed. Rep. of Germany . |
| 3128348 | 2/1983 | Fed. Rep. of Germany . |
| 3542332 | 6/1987 | Fed. Rep. of Germany . |
| 2076407 | 10/1971 | France . |
| 2455940 | 12/1980 | France . |
| 1240487 | 7/1971 | United Kingdom . |
| 2050926 | 1/1981 | United Kingdom . |
| 2088414 | 6/1982 | United Kingdom . |
| 2187995 | 9/1987 | United Kingdom . |

OTHER PUBLICATIONS

"Slip Casting of Metal Powders", Chapter 13, Henry H. Hausner, pp. 221-238.

*Primary Examiner*—James Derrington

*Attorney, Agent, or Firm*—Burns, Doane, Swecker & Mathis

[57] ABSTRACT

Process for the production of a component, in which metal or ceramic powder (6) is applied under centrifugal force to the inner wall of a gas-permeable mold (13), which is under reduced pressure and is located in a reduced-pressure vessel (10), and precompacted, after which the mold (13) is removed from the vessel (10) and sintered. The mold (13) consists of a heap of ceramic grains with an organic binder having high strength between room temperature and a temperature just below the sintering temperature, in order to support the powder (6) to be sintered to give the component. When sintering starts, the binder evaporates or burns away, as a result of which the mold (13) substantially loses its supporting action for the component. Binder: aminolic, phenolic, furan resin.

12 Claims, 3 Drawing Sheets

FIG. 1
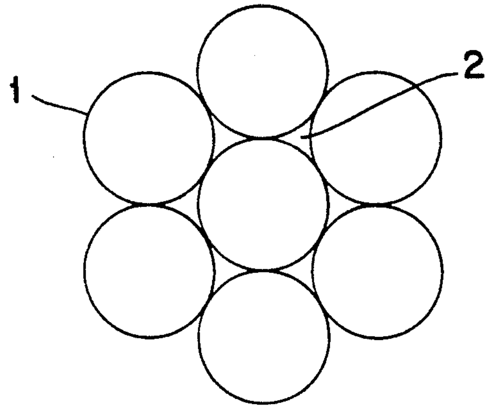
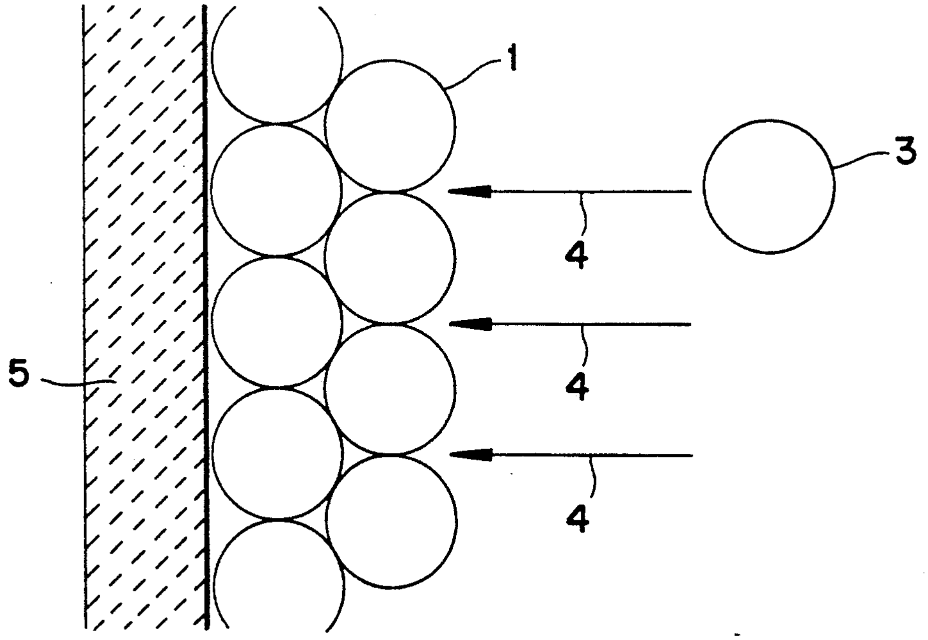
FIG. 2

PROCESS FOR THE PRODUCTION OF A COMPONENT BY PRODUCING A MOLDING USING A METAL OR CERAMIC POWDER AS THE STARTING MATERIAL

Process for the production of a component by producing a molding using a metal or ceramic powder as the starting material.

BACKGROUND OF THE INVENTION

1. Field of the Invention

The invention relates to production of complex components from metallic or ceramic materials wherein powders are used as the starting materials. The invention also addresses questions concerning shrinkage due to sintering and hot-isostatic pressing.

The invention relates to the further development, perfection and simplification of powder-metallurgical production methods for the production of workpieces of comparatively complex shapes, where the problems of shrinkage during sintering play an important role. The preferred field of application is the component sector in turbine construction.

In the narrower sense, the invention relates to a process for the production of a component. The process includes (a) producing a molding using a pourable metal or ceramic powder as the starting material, by applying the powder, transported by means of a stream of gas, under centrifugal force to the inner wall of a mold which is under reduced pressure and (b) sintering the precompacted body.

2. Discussion of Background

Powders are used as the starting materials in numerous production methods in the metallurgical and ceramics industries. Powder-metallurgical processes have the advantage that virtually any desired shape can be achieved. The intention is to produce finished workpieces by a powder metallurgy process which eliminates some or all of the expensive machining costs. The starting materials in all of the known processes for obtaining net shapes or near-net shapes of the workpieces are slurries (slip, paste) of powders in solvents using a binder. The following additives are used in powder mixtures:

A. water+binder+additive (slip casting, freeze drying);

B. water+cellulose (metal-powder injection molding (MIM) by the Rivers process); and C. thermoplastics (metal-powder injection molding).

With all of these wet-mechanical methods numerous difficulties arise with regard to quality, freedom of shaping, reproducibility and choice of the composition. Such difficulties include the following:

1. Bubble formation when mixing powder with binder and solvent.

2. Restriction of the wall thickness of the workpieces (for example max. 5-10 mm for "MIM"), since otherwise the binder can no longer be completely removed.

3. The occurrence of binder residues (for example carbon), which, even after "burning out" the binder, remain behind in the workpiece and can impair its composition in an uncontrolled manner.

4. The necessity for fresh selection/fresh development of the binder when changing to other shapes and/or compositions of the workpieces.

In the case of metal injection molding (MIM) a mixture of the metal powder to be compacted is injected into a mold together with a suitable thermoplastic in accordance with the injection molding technology. A summary of the methods for "Metal Injection Molding" is given in a chapter of the Metals Handbook.

A particular problem with this technology is, on the one hand, the fact that in general considerably finer powders have to be employed than is usually the case in powder metallurgy. On the other hand, the organic binder must be removed by a laborious process before the actual sintering process, which leads to a considerable increase in the cost of the process.

The vacuum-molding process, which serves for the production of casting molds from refractory granular mold material, as a rule quartz sand, is known from casting technology. By evacuation of the air from a heap of binder-free sand surrounded by sheeting, a reduced pressure is generated in said sand, as a result of which a compressive pressure is exerted by the adjacent outside gas atmosphere via the sheeting on the loose sand fill. The compressive strains thus caused between the grains prevent the mutual mobility of the latter. As a result, a mechanically strong body of defined shape is formed from a loose heap.

In the production of moldings which are subjected to a subsequent sintering process, the uniformity of the loose powder fill at all points of the molding is extremely important since the local extent of shrinkage, and thus the dimensional accuracy, are a function of the local settled apparent density.

There are processes from the field of powder metallurgy where mixtures of a metal powder with a liquefied organic phase are injected into molds by the injection molding process. After the filling operation, a compact composite of uniform density is formed, from which the organic binder must be removed before the actual sintering process starts.

There are other processes in which essentially dry powders are filled into a mold under vacuum. This operation can, for example, also be supported by a suitable vibration or shaking operation. However, because of the frictional resistance of the powder, there are limits to the complexity of shaping. In addition, there is a risk that the various grain fractions of a powder will demix under the influence of the movement of the powder, especially under the action of vibrations, as a result of which an inhomogeneous sintered compact forms.

With the aid of one process, for example, a molding is produced by a procedure in which a pourable molding composition is fluidized using a transport gas. The molding composition passes into the interior of a mold which is under reduced pressure and which contains suction orifices at certain points for drawing off the transport gas. A substantial part of the description of this process is dedicated to the optimum sizing and arrangement of these suction orifices and to the optimum timing of the injection and suction processes, since both the geometrical arrangement and the timing are of extremely great importance for the production of a molding having a uniform settled apparent density. When the fluidized powder penetrates into the interior of the mold, expansion of the gas occurs along with kinetic acceleration of the powder particles. As a result, powder particles are driven by centrifugal force against the wall of the mold. However, since the wall of the mold is impermeable to gas in substantial sections, only a coating of the wall is achieved by the kinetic energy of the grain particles. Thus, special precautions must be taken in order to prevent premature blocking of the off-gas channels by powder preferentially flying in this direction.

The following publications are cited as representative of the prior art:

GB Pat. Appl. 2088414
EP Pat. Appl. 0191409
DE-A-3,101,236
DE-A-3,128,347
DE-A-3,128,348
DE-A-3,542,332

R. Billet, "PLASTIC METALS: From Fiction to Reality with Injection Molded P/M Materials", Parmatech Corporation, San Rafael, Calif., P/M-82 in Europe Int. PM-Conf. Florence I 1982.

Göran Sjöberg, "Powder Casting and Metal Injection Molding", manuscript submitted to Metal Powder Report September 1987.

Henry H. Hausner, "Slip Casting of Metal Powders", in "Perspectives in Powder Metallurgy", Hausner et al., Plenum Press 1967.

The known processes leave something to be desired. There is therefore a need for improvement and further development of the powder-metallurgical/powder-ceramic production methods.

SUMMARY OF THE INVENTION

An object of the invention is to provide a process wherein pourable metal or ceramic powders are used as starting materials to produce a workpiece of comparatively complex shape and of any desired cross-section and unlimited wall thickness. With this process a green strength adequate for further processing should be achieved for the green compact. The process should provide a reproducible finished product which requires no further, or at most slight, additional machining. During powder processing, bubbles and undesirable harmful residues should be avoided. The process should ensure the maximum possible freedom and universality with respect to the choice of shape and the composition of the workpiece to be produced.

According to one aspect of the invention, powder is introduced into a gas-permeable mold made of a material which consists of a heap of ceramic grains. The grains are held together by a small amount of a binder of essentially organic composition. Thus, the mold has a high mechanical strength in the range between room temperature and a temperature which is just below the sintering temperature of the powder making up the molding. Thus, the binder is able to support the molding and the binder loses its strength, and thus its supporting action, in a temperature range where the molding, as a consequence of the sintering process which is initiated, acquires a sufficient inherent strength to maintain its shape. The binder partially or completely evaporates and/or burns away in said temperature range while under the influence of the oxidizing or reducing action of the furnace atmosphere.

According to the invention it is possible to produce moldings from pourable powders which either achieve a green strength such that they can be released from the mold and fed to a sintering process or they can be subjected to a sintering process inside the mold itself. In the latter case, the mold serves as a back-support for the molding, must not enter into any reactions with the molding under the influence of the temperature and must be removable from the mold after conclusion of the sintering process. The powder from which the molding is formed from can be a metal powder or a ceramic powder or a mixture of these powders.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a diagrammatic view (seen in the flow direction of the gas stream) of an idealized loose fill of globular powder particles (hexagonally densest spherical packing), FIG. 2 shows an outline/section (seen vertically to the flow direction of the gas stream) of an idealized loose fill of globular powder particles (hexagonally densest spherical packing) at the wall of a mold.

DESCRIPTION OF THE PREFERRED EMBODIMENTS

Figure 3:
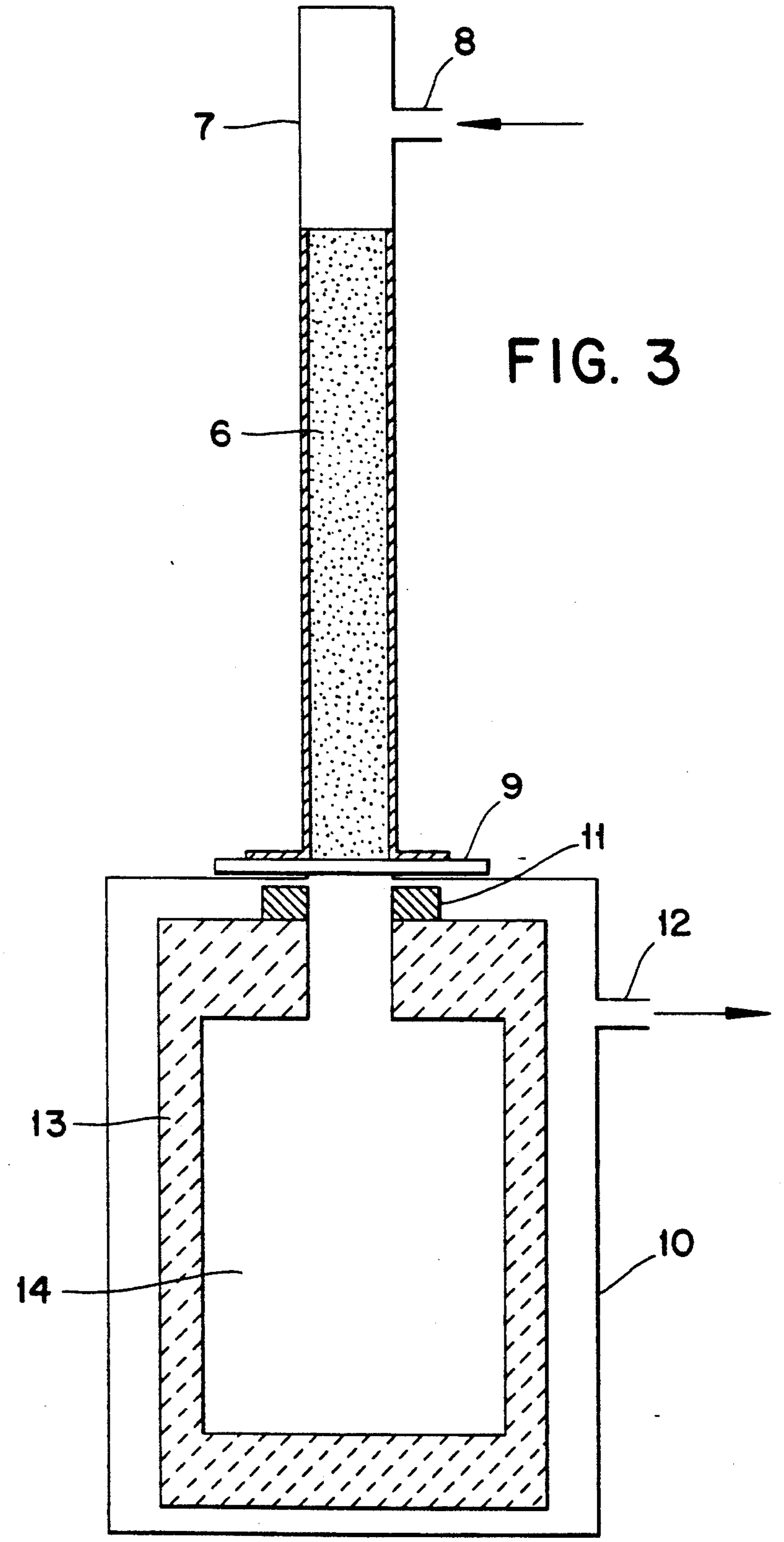
FIG. 3 shows an outline/section of an installation for carrying out the process, at the time prior to filling of the mold.

Referring now to the drawings, wherein like reference numerals designate identical or corresponding parts throughout the several views, in FIG. 1 a diagrammatic view (seen in the flow direction of the gas stream) is given of an idealized loose fill of globular powder particles (hexagonally densest spherical packing). FIG. 1 shows an idealized globular powder particle 1 in the densest loose fill (shown as a sphere for simplification) and the open-pore space 2 between adjacent powder particles (flow channel for gas stream).

FIG. 2 shows an outline/section (seen vertically to the flow direction of the gas stream) of an idealized loose fill of globular powder particles (hexagonally densest spherical packing) at the wall of a mold. The reference numeral 1 is identical to that in FIG. 1. FIG. 2 shows a powder particle 3 flying vertically toward the inner wall of the mold, the gas flow 4 which flows vertically onto the surface of the loose powder fill and the gas-permeable wall 5 of the porous (open-pore) mold.

In the process under consideration, the entire wall 5 of the mold, consists of a gas-permeable porous material, the porosity, at least in the region of the inner surface of the mold, having a pore diameter which prevents the penetration of powder grains, even of the smallest size. Since the entire inner surface of the gas-permeable mold, which is under a reduced pressure and to which a reduced pressure is applied from the outside, is available for the gas transport, the fluidized powder (particles) can, in principle, reach any point of the mold. As a result, a uniform coating operation can be self-controlled in that points on the wall 5 which have been more thickly coated with powder have a higher flow resistance. Thus, further fluidized powder is directed to those points on the wall 5 where the coating thickness is not yet as great, i.e., where a lower flow resistance exists. Due to the fact that the molding builds up from the fluidized gas/powder phase in layers from the wall 5 toward the center, a very dense packing is possible, since the individual impinging powder grains do not arrive in close association and thus are hindered in their residual mobility but still possess a certain lateral freedom of movement.

This operation is also supported by an aerodynamic phenomenon, which is shown in the flow direction in FIG. 1 and in the direction vertical thereto in FIG. 2. This simplified view will be considered with particles 1 in the shape of spheres of identical size. The observations made can, however, also be applied analogously to loose fills with spheres of different sizes or with bodies which deviate from the ideal spherical shape. If a gas stream flows through the densest spherical packing, the gas stream impinges on the surface of the loose fill at the open-pore spaces 2 in the loose fill, where three spheres butt against one another. At this flow channel there is a point of increased speed and reduced pressure, whilst directly in front of the spheres a point of low speed (stagnation point) exists. If a further sphere (powder particle 3) now flies against a loose fill of this type it will be deflected immediately before impinging on this loose fill into one of these flow channels and therefore purposefully arrives at a point which corresponds to the densest packing. As soon as it is in this position, it constitutes an obstacle to flow, i.e., the further spheres are automatically arranged alongside it by the flow field also influenced by it. This effect can occur only in the case of a loose fill through which the flow is vertical and which is supported at the back by a gas-permeable wall 5. If this wall has only a few gas outlets, this effect cannot take place at all points in the mold where there is no gas permeability. Slower flow kinetics of the powder grains in the region of the wall 5 also result from the fact that, with this process, the entire inner surface of the wall 5 is available for transporting away the fluidizing gas. That is, the flow can be distributed over a large surface and, thus, a reduced energy results on impact, as a result of which both the grain and the wall 5 are protected.

FIG. 3 relates to an outline/section of an installation for carrying out the process, at the time prior to filling of the mold. FIG. 3 shows the pourable powder 6, a vessel 7 and a gas inlet 8. The powder 6 (metal, ceramic) to be processed, at the start of the process sequence is in the storage vessel 7. The gas inlet 8 allows the transport gas, required for the fluidization of the powder 6, into the storage vessel 7. The storage vessel 7 is closed at the bottom by a bursting sheet 9, as a barrier element for the powder 6. A reduced-pressure vessel 10 is connected, via an intermediate seal 11, to the bursting sheet 9. This vessel is provided with a suction line 12, which is connected to a vacuum pump (not shown). A gas-permeable divided or undivided mold 13 made of ceramic material and an organic binder is located in the vessel 10. A cavity 14 (inner space) is provided within the mold 13.

Figure 4:
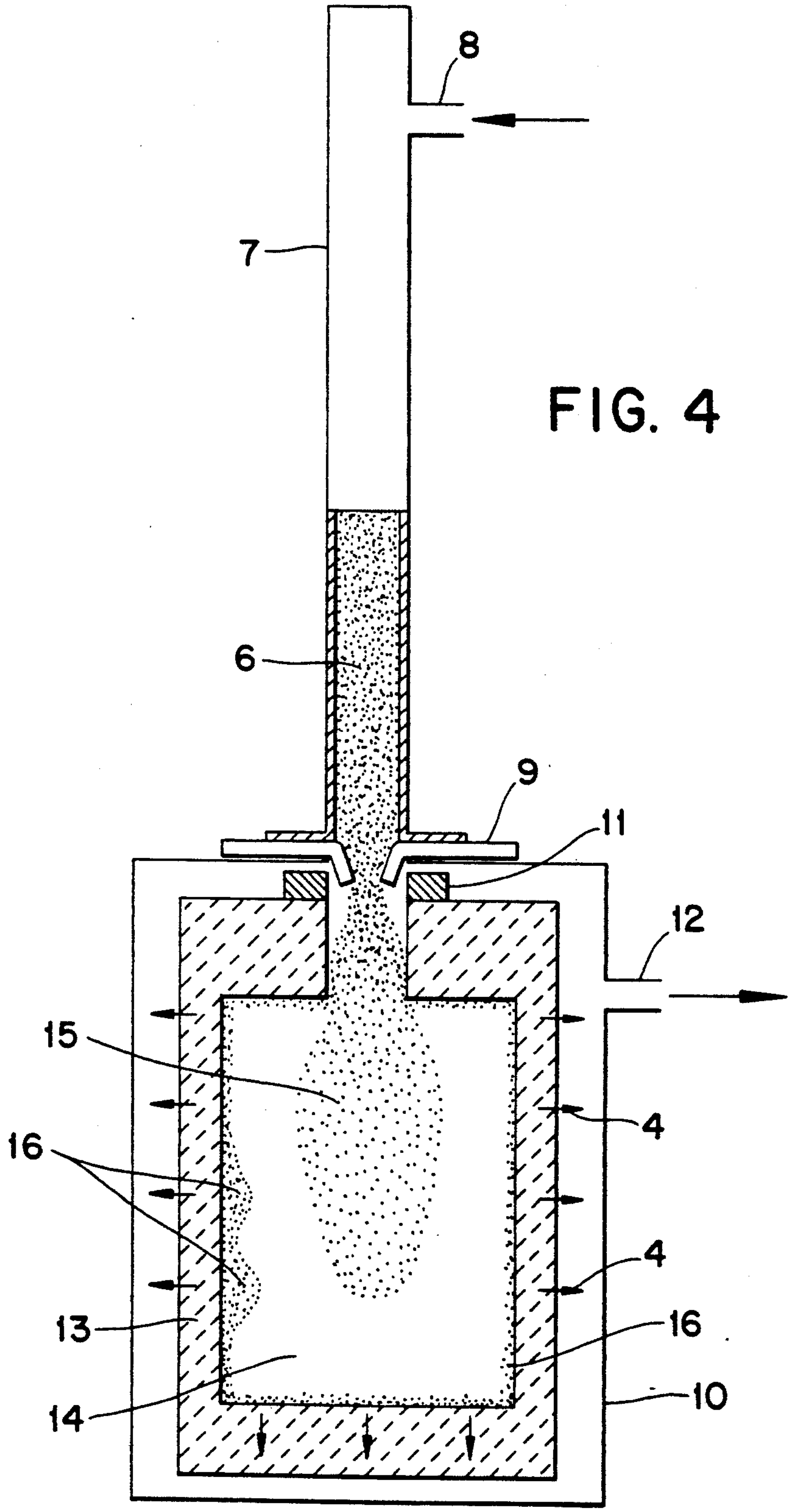
FIG. 4 shows an outline/section of an installation for carrying out the process, during filling of the mold.

FIG. 4 shows an outline/section of an installation for carrying out the process, during filling of the mold. The reference numbers 6 to 14 correspond precisely to those in FIG. 3. The bursting sheet 9 is shown here in the broken-through state, where it releases the path for the powder 6 in the direction of the cavity 14 of the mold 13. A powder jet 15 (powder cloud), is formed by the fluidized powder, in the cavity 14. The gas flow 4 extends vertically onto the powder surface and through the wall of the mold 13. The dynamically packed powder layer 16 is applied under centrifugal force to the inner wall of the mold 13. Depending on the shape of the mold 13 and the flow conditions, said powder layer can have different thicknesses instantaneously.

The core of the invention lies in the fact that the material used for the gas-permeable porous mold (for powder metallurigical or powder ceramic production of a complex component) is a heap of ceramic grains held together at the points of contact by an organic binder based on a plastic, e.g., aminoplast, phenolic, furan resin, waterglass or synthetic resin. During the rise in temperature required for the heat treatment (drying, decomposition and expulsion of gases, sintering), the materials, built up from powder particles, of workpiece (component) and tool (mold) behave in opposing manners. In the case of the workpiece, the strength and the resistance to a change in shape increase as a result of local adhesion and softening and finally sintering. In the case of the tool, the same parameters decrease as a result of decomposition, chemical change, melting and evaporation of the heat sensitive binder. By this means, the shape of the workpiece is maintained in the critical temperature range and, despite this, its freedom of movement during shrinkage is not substantially impaired.

The invention is not restricted to the examples as described in the drawings.

The invention provides a process for the production of a component by producing a molding. According to the process, a pourable metal or ceramic powder 6 is used as the starting material and the powder 6 is transported by means of a stream of gas 4, under centrifugal force to the inner wall of a mold 13 which is under reduced pressure. A pre-compacted body is formed by introducing the powder into a gas-permeable mold 13 made of a material which consists of a heap of ceramic grains, which are held together by a small amount of a binder of essentially organic composition. The mold 13 has a high mechanical strength in the range between room temperature and a temperature which is just below the sintering temperature of the powder making up the molding. During sintering of the powder, the mold is able to support the molding but the binder loses its strength. Therefore, its supporting action, in a temperature range where the molding, as a consequence of the sintering process, acquires a sufficient inherent strength to maintain its shape. The binder partially or completely evaporates and/or burns away in said temperature range under the influence of the oxidizing or reducing action of the furnace atmosphere. With this process, the material for the mold can consist of a mold sand based on quartz and/or zirconium silicate with an organic binder selected from the group comprising non-compactable sand mixtures with synthetic resin binding.

The organic binder can consist of a synthetic resin chosen from one of the groups comprising aminoplasts or phenolics or furan resins. The sand is preferably coated warm or hot with a binder comprising phenolic resins/novolaks.

Advantageously, the organic binder consists of waterglass and a synthetic resin. A primary curing takes place via treatment with carbon dioxide gas and the final curing takes place via the complete curing of the synthetic resin under the action of heat.

In a particular embodiment of the process, the material for the mold consists of a granular glass frit containing an organic binder, which frit vitrifies at elevated temperatures as the organic bond weakens and subsequently dense-sinters.

Quite generally, a sand cold-, warm- or hot-coated with synthetic resin is used for the process.

Obviously, numerous modifications and variations of the present invention are possible in light of the above teachings. It is therefore to be understood that within the scope of the appended claims, the invention may be practiced otherwise than as specifically described herein.

What is claimed is:

1. A process for the production of a component comprising steps of:

producing a pre-compacted body by transporting a loose metal and/or ceramic powder as a starting material in a stream of gas and applying the powder starting material to an inner wall of a gas-permeable mold under reduced pressure, the pas-permeable mold comprising ceramic grains held together by a heat sensitive binder; and sintering the pre-compacted body by heating the body in the gas-permeable mold to a sintering temperature, the gas-permeable mold having a mechanical strength sufficient to support the body as the body is heated from room temperature to just below the sintering temperature, the body having a strength which increases sufficiently to maintain its shape as the binder, in turn, loses its strength, and thus its supporting action as the body is further heated to the sintering temperature, the binder partially or completely evaporating and/or burning away during sintering of the body.

2. The process as claimed in claim 1, wherein the gas-permeable mold consists of a mold sand based on quartz and/or zirconium silicate with an organic binder comprising a synthetic resin and non-compactable sand mixture.

3. The process as claimed in claim 2, wherein the organic binder is a synthetic resin comprising aminoplasts or phenolics or furan resins.

4. The process as claimed in claim 3, wherein the mold sand is coated warm or hot with a binder comprising a phenolic resin.

5. The process as claimed in claim 2, wherein the organic binder consists of waterglass and a synthetic resin, a primary curing of the binder taking place via treatment with carbon dioxide gas and final curing taking place via complete curing of the synthetic resin under the action of heat.

6. The process as claimed in claim 1, wherein the gas-permeable mold consists of a granular glass frit containing an organic binder, which frit vitrifies at elevated temperatures.

7. The process as claimed in claim 1, wherein the gas-permeable mold comprises a sand cold-, warm- or hot-coated with synthetic resin.

8. The process as claimed in claim 1, wherein the gas-permeable mold comprises a porous material at least in a region of the inner wall thereof, the porous material having a pore diameter which prevents penetration of the powder starting material.

9. The process as claimed in claim 1, wherein the entire inner wall of the gas-permeable mold is under a reduced pressure while the powder starting material is applied to the inner wall of the mold, the powder starting material being built up in layers towards a center of the gas-permeable mold to provide dense packing of the powder starting material as the pre-compacted body is formed.

10. The process as claimed in claim 1, wherein the gas-permeable mold is supported in a reduced-pressure vessel and the entire inner wall of the gas-permeable mold removes gas from the mold as the pre-compacted body is formed.

11. The process as claimed in claim 1, wherein the sintering step is carried out in a furnace having an oxidizing or reducing atmosphere.

12. The process as claimed in claim 1, wherein the component comprises a component of a turbine.

* * * * *